Figure 10:
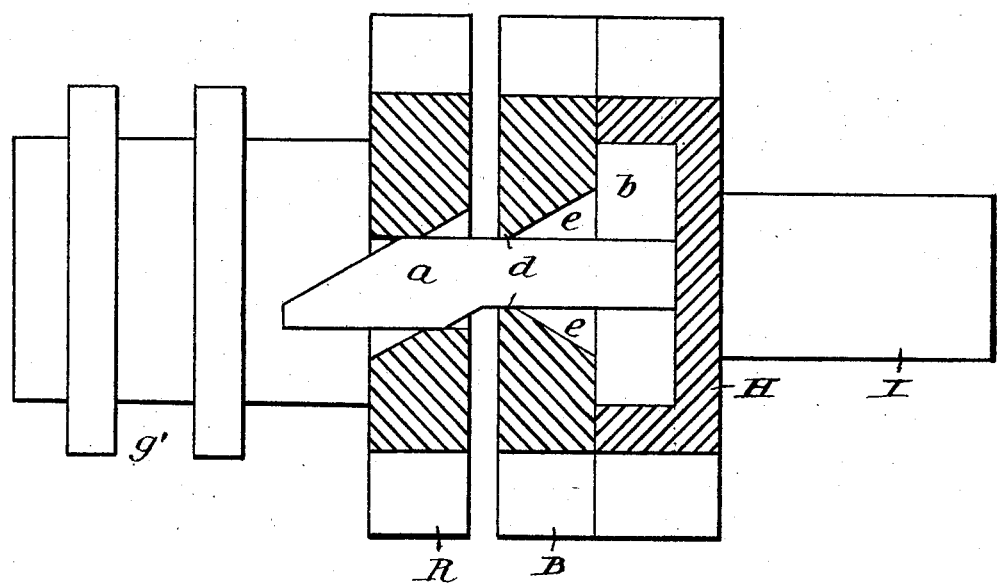

No. 857,679. PATENTED JUNE 25, 1907.
T. SCHEFFLER.
VARIABLE SPEED AND POWER TRANSMITTING DEVICE.
APPLICATION FILED APR. 28, 1906.
3 SHEETS—SHEET 1.
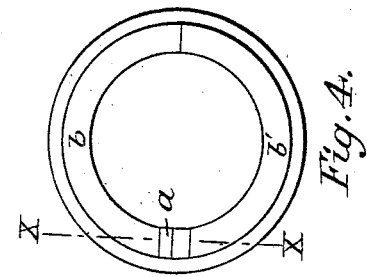
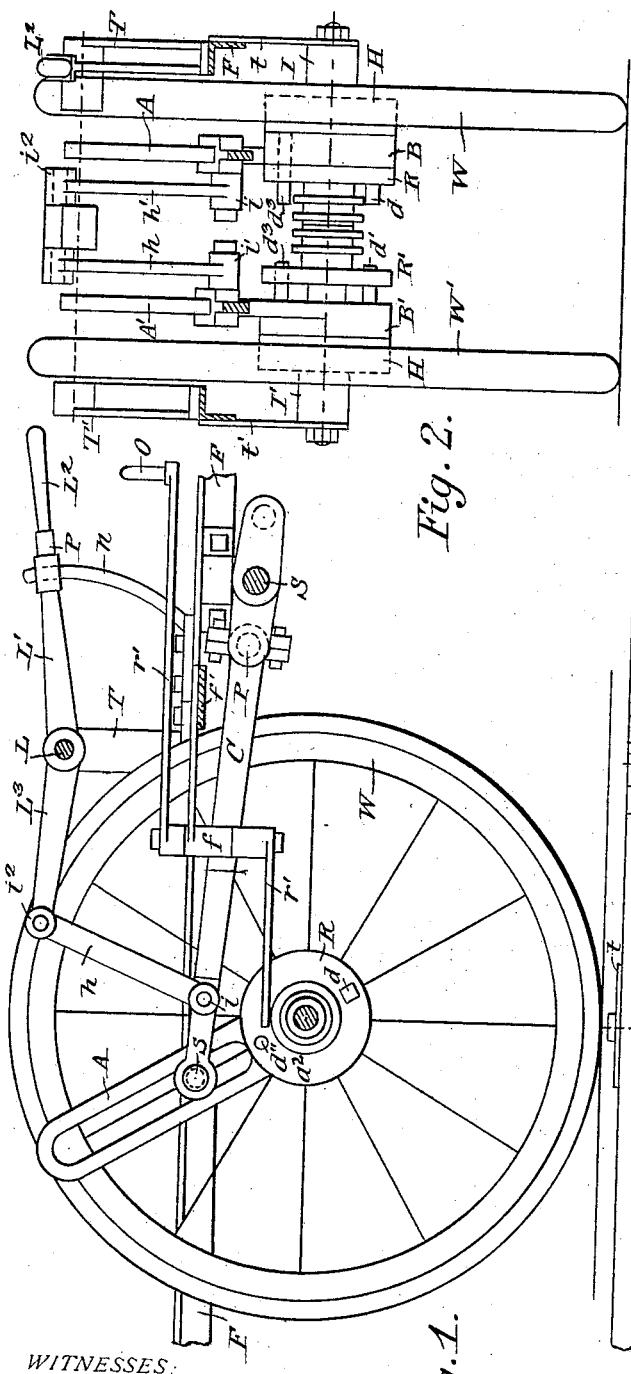
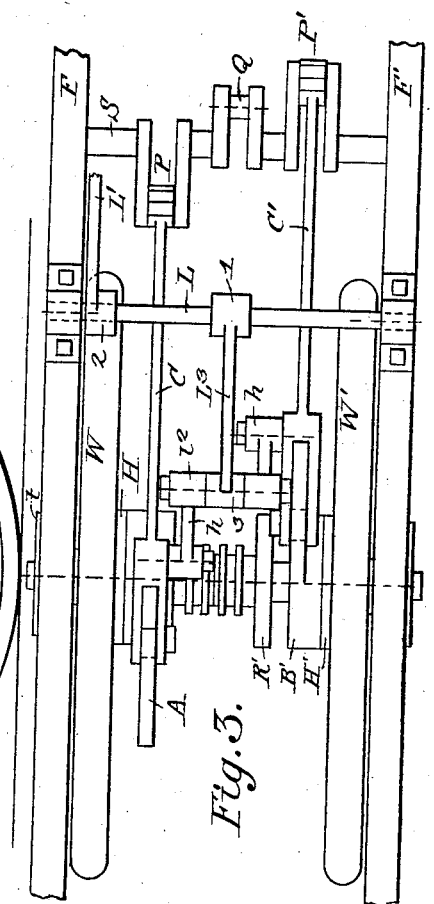
WITNESSES:
Francis Seymour
Edith Benz
INVENTOR.
Theodore Scheffler.
BY John F. Kerr
ATTORNEY.

No. 857,679. PATENTED JUNE 25, 1907.
T. SCHEFFLER.
VARIABLE SPEED AND POWER TRANSMITTING DEVICE.
APPLICATION FILED APR. 28, 1906.
3 SHEETS—SHEET 2.
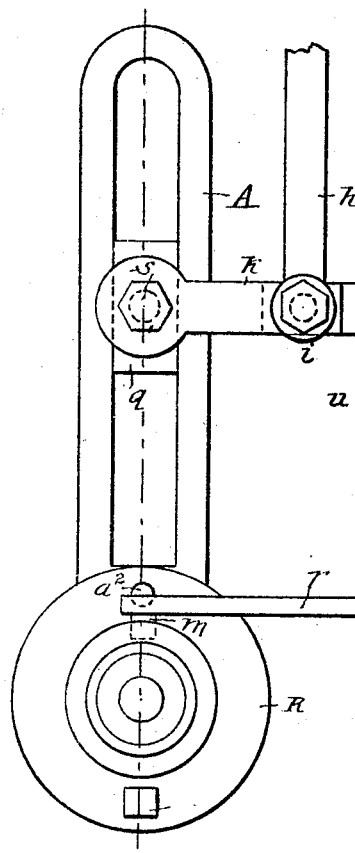
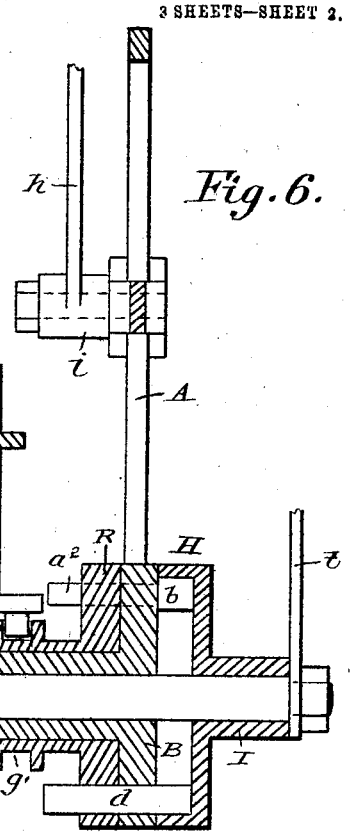
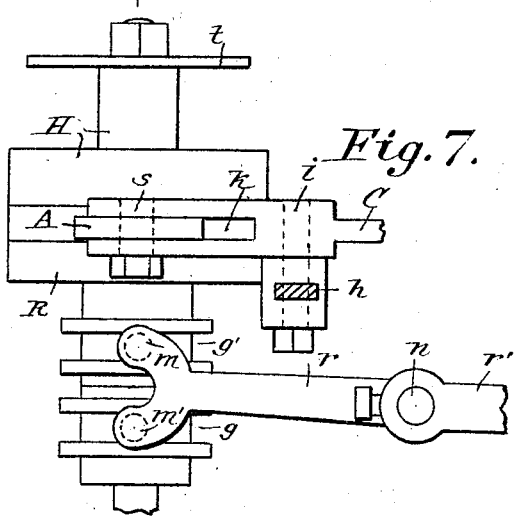
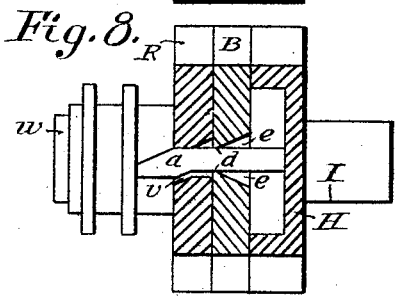
WITNESSES:
Francis Seymour
Edith Benz
INVENTOR.
Theodore Scheffler
BY John F. Kerr
ATTORNEY.

No. 857,679. PATENTED JUNE 25, 1907.
T. SCHEFFLER.
VARIABLE SPEED AND POWER TRANSMITTING DEVICE.
APPLICATION FILED APR. 28, 1906.

3 SHEETS—SHEET 3.

WITNESSES:
Edith Benz.
James Egan

INVENTOR.
Theodore Scheffler.
BY John F. Kerr
ATTORNEY.

UNITED STATES PATENT OFFICE.

THEODORE SCHEFFLER, OF PATERSON, NEW JERSEY.

VARIABLE-SPEED AND POWER-TRANSMITTING DEVICE.

No. 857,679.   Specification of Letters Patent.   Patented June 25, 1907.

Application filed April 28, 1906. Serial No. 314,311.

*To all whom it may concern:*

Be it known that I, THEODORE SCHEFFLER, a citizen of the United States, residing at Paterson, in the county of Passaic and State of New Jersey, have invented certain new and useful Improvements in Variable-Speed and Power-Transmitting Devices, of which the following is a specification, reference being had therein to the accompanying drawing.

This invention relates to the transmission of power in vehicles, as well as to the change of speed and the direction in which the vehicle is propelled. The invention is likewise applicable to shaftings, pulleys, hoisting-engines steam and electrical railroad cars, and other mechanisms too numerous to mention; but in the accompanying drawings my invention is shown as embodied in, and applied to automobiles.

One object of this invention is to dispense with all gearing and chains in the propelling of vehicles; another object is to provide means for the change of the speed without the use of gearing and chains; another object is to provide means for reversing or changing the direction of propulsion without gearing and chains and without stopping the engine and a still further object of the invention is to provide means for stopping or bringing a vehicle to a stand still without gearing or chains and without stopping the engine.

As shown in the drawings which form a part of this specification I communicate power from the engine shaft to either the axle or wheels of the vehicle through reversible friction clutches, the connections being made by means of shifting or shiftable connecting rods extending from the engine cranks to clutch-levers that are attached to clutch-hubs mounted on the vehicle axle. To the outer end of each connecting rod is secured a hanger through which the connecting rods are raised or lowered by means of a lever, the outer end of each connecting rod being secured and movable in a longitudinal opening in its respective clutch-lever; for the adjustment and regulation of the swing of said clutch-lever, in order to regulate the speed of the vehicle. A pair of reversing clutch-hubs movable horizontally on the sleeves of the clutch-hubs are the means provided for changing the direction of the propulsion or for bringing the vehicle to a standstill all of which may be accomplished without stopping the engine. The stopping, starting or backing of the vehicle is determined by the distance which said reverse clutch-hubs are moved in a horizontal direction by means of suitable hand lever.

It is obvious that I may lock either the axle or the wheel to propel the vehicle in the desired direction; or may release the same when desired; or I may automatically lock or release the opposite wheels alternately in propelling the vehicle in one direction, without departing from the spirit and scope of my invention.

A portion of the devices shown in the drawings are improvements on patents issued to me March 17, 1891, No. 448,575 and June 9, 1903, No. 730,481.

In the accompanying drawings, in which similar letters of reference indicate like parts, Figure 1 is a longitudinal section of the driving mechanism of an automobile, Fig. 2 is an end-view, Fig. 3 a plan, Fig. 4 is an end-view of clutch-ring casing with two half-rings and end of clutch-pin, Fig. 5 is an end-view of reverse hub with reverse mechanism, also showing clutch-lever —A— and lifting mechanism of connecting rod —C— in detail, Fig. 6 is a sectional view through clutch, parallel with shaft —S'—, Fig. 7 is a plan of clutch with reverse lever arrangement, Figs. 8 and 9 sectional views through line $xx$ Fig. 4, and Fig. 10 is a sectional view through line $xx$ of Fig. 4 showing the relative positions of the reverse-hub, clutch-hub, wheel hub and canting clutch pin, when the clutch-pin does not cant and the wheel-hub is unlocked and capable of rotating in either direction on the axle.

To the hubs —I—, —I'— of the wheels —W— —W'— of an automobile are attached the clutch-ring casing —H—, —H'— of the friction-clutch, the clutch-pin hubs —B—, —B'— have elongated sleeves —w—, —w'— fitting loosely on the shaft —S'—; the clutch-pin —a— passes through an opening of angular shape —d—e—e— in —B—, at end —d— fitting the sides of —a— forming a fulcrum for the pin; to the top ends —B— and —B'— are secured the slotted clutch-levers —A—, —A'— into which fit sliding blocks —q—, to the centers of the same are connected at —s— the ends of connecting-rods —C—, —C'—, while the other ends of —C—, —C'— are coupled to the crank-pins —P—, —P'— of the driving shaft —S— —P— and —P'— being opposite or 180° apart, and the motion transferred to levers —A— and —A'—, then when one lever is beginning the stroke the other has finished it. The friction clutches to which these levers are secured are constructed so, that when one lever is locked the other is free on shaft —S'—, therefore the first one turning the wheel, the other producing no motion, only when it begins the same motion as the first one, it will move the wheel to which it is attached, and continuous revolutions of the crank shaft will produce a continous motion of the carriage to which the wheels are attached. The wheel-hubs of the clutch-ring casings are allowed to turn on shaft —S'—, which is fastened on the ends to pedestals —t—, —t'— attached to frames —F—, —F'— of carriage. A shaft —L— is located above the frames —F—, —F'— with bearings —T—, —T'— on —F—, —F'—, attached to said shaft are levers L³, L', L³ has hub 1 on one end fastened to shaft —L— and the other end has hub —3— to which are fulcrumed the hubs —i²—, of lifting hangers —h—, —h'—, with hubs —i—, —i'— at lower end, the latter being fulcrumed to the forked ends —k— of the connecting rods —C—, —C'— a short distance from —s—; the lever —L'— is attached on one side to —L— with hub —2—, the other end has a slotted square hub which is allowed to move on an arc guide —n— to which it may be fastened with a threaded handle —L²— at —P—, for various positions as required for various speeds. When the end —s— of connecting-rod —C— is near the center of the wheel-shaft —S'— the clutch-lever —A— will describe a greater angle by one revolution of crank than when at the extreme end of lever —A—, therefore different speeds may be obtained by shifting the end of —C— to different heights on —A—, by raising or lowering lever handle —L²—.

The reverse-hubs —R—, —R'—, have grooved sleeves —g—, —g'— loosely fitting on clutch-pin hub sleeves —w—, —w'— allowing a transverse motion parallel with the wheel shaft —S'—, but guided by steady pins —a²—, —a³— these hubs are allowed the same reciprocating motion with the clutch-pin hubs. The flat parts of the hubs have openings through which pass the clutch-pins —a—, —a'—, as shown in detail in Figs. 5, 6, 8, 9, the opening plainly seen in Figs. 8, —9— has two parallel sides in the same direction as clutch-pin —a— and are of the same width as —a— on that end, from these sides are cut off angular pieces increasing the opening on pin end and on end toward —B—, the end of clutch-pin has a taper end and farther back is also sloped toward the main body of the prismatic part of the pin, so that when —R— is close to —B— a space —V— will be left between lower side of pin and upper side of opening in —R— as shown in Fig. 8. When —R— is moved off some distance from —B— a space —v'— is produced between the upper side of pin and lower side of opening in —R—, as shown in Fig. 9, the opposite sides to these spaces —v— and —v'— are the straight sides of —a— and openings in —R—. The straight prismatic end of the clutch-pin enters the space between the two half clutch-rings —b b'— which abut opposite the pin, they are inclosed in casing —H—. As described above the narrow space in angular shaped opening in clutch-pin hub forming a fulcrum for the clutch-pin —a—, the latter will be allowed to cant in either direction when the fulcrum is moved either to right or left and tighten the two half-rings in the casing so that a rocking motion would be produced, but by introducing the reverse-hub at the end of clutch-pin hub —B— the clutch-pin can cant only when it is thrown by the fulcrum toward the open space —v— in —R— and when moved the other way the flat side of pin will touch the flat side of opening in —R—, Fig. 8, and the clutch is unlocked, but when —R— is moved some distance away from —B— as shown in Fig. 9, the motion will be reversed, so that in the first position the clutch may be locked to the wheel, when going forward, while when required to go back-ward it is necessary to shift the reverse-hub —R—. The reversing is done by levers —r—, —r'—, the lever —r— has a forked end with short studs —m—, —m'— which enter the grooves —g—, —g'— on the sleeves of —R—, —R'— permitting the shifting of —R— and —R'— simultaneously so that when —R— is up to —B—, —R'— is away from —B'— and when reversed by shifting the lever, the opposite takes place, the reversing may be done when the machine is in motion in either direction. The levers —r— and —r'— are fastened to a short shaft —n— having a bearing in hub —f— which is fastened to a cross-bar —f'— between frames. The lever —r'— ends forward in a handle —o—. There is also an intermediate position where —R— and —R'— are placed in relation to the clutch-pins so that the straight sides on both sides of pins touch both sides of openings of —R—, and —R'—; then the clutch will be released both ways, the crank shaft may turn but produce no motion of wheels. This intermediate position is shown in Fig. 10. There the wheel-hub or split-ring casing is loose on axle —S'— and the clutch hub —B— and reverse-hub —R— are oscillated by the rocking of the clutch-lever —A— through the working of the engine without affecting in any way the said hub —H—. —Q— is the engine crank-pin.

From the above description it is obvious that my invention by means of a device which is simple, durable, positive, practical and effective accomplishes the following objects: It dispenses with all gearing. It affords control of maximum and minimum speed, and all intermediate speeds obtained by one lever. (Usual throttle also used.) No driving chains required. No driving shaft with bevel gears, etc., required. Power applied directly from engine at all times to axle of wheel without gearing of any kind. Can be reversed at will of operator, without stopping engine or in emergency reverses automatically, locks wheels or axles from running in opposite direction to that required by operator. Ascending grades or steep hills it is impossible for car to run back, even if no brake is applied, should an accident to machinery occur. No auxiliary brake required. Descending grades or steep hills, should brake give out or control of car be lost by operator, wheels can be absolutely locked by applying reverse lever. No auxiliary brake required. Dispensing with all gears or chain drives adds at least 20% to the efficiency of the engine, thus permitting this additional amount of power to be applied directly to driving car, instead of losing it in friction, etc.

The invention may be applied to any existing engine as the improvements relate to the transmission of power therefrom and to change of speed and direction of vehicle.

While the mechanism illustrated in the drawings clearly shows my invention practically applied, it is obvious that many changes and modification may be made in the construction shown without departing from the broad scope and spirit of my invention.

With this description of my invention, what I claim is:—

1. The combination with an axle, of a casing having an annular receptacle, a split expanding ring carried in said receptacle, a clutch-hub loosely mounted on said axle and having an opening therethrough the sides of which form a fulcrum for a canting clutch-pin, a reverse-hub provided with a like opening therethrough the sides of which are partly parallel with and partly at an angle to, the axle, and a canting clutch-pin passing through the openings of the reverse-hub and clutch-hub into the split-ring casing between the abutting ends of the split-ring, substantially as set forth.

2. In a vehicle, the combination with an axle, of a wheel-hub having an annular receptacle therein, a split expanding ring carried in said receptacle, a clutch-hub loosely mounted on said axle and having an opening therethrough the sides of which form a fulcrum for a canting clutch-pin, a reverse-hub fitted on said clutch-hub adapted to rotate therewith and to be moved horizontally thereon, and provided with a like opening therethrough the sides of which are partly parallel with, and partly at an angle, to the axle, a canting clutch-pin passing through the openings of the reverse-hub and clutch-hub into the wheel-hub between the abutting ends of the split-ring, and means for moving the reverse-hub horizontally on said clutch-hub substantially as set forth.

3. In a vehicle, the combination with an axle, of a pair of wheel-hubs each having an annular receptacle therein, a split-expanding ring carried in each of said receptacles, a pair of clutch-hubs having their inner ends abutting each other and their outer ends abutting against said wheel-hubs, an opening passing through each of said clutch-hubs, the sides of said opening forming a fulcrum for a canting clutch-pin, a pair of reverse-hubs fitted on the sleeves of said abutting clutch-hubs adapted to rotate therewith and horizontally movable thereon, like openings through said reverse-hubs, the sides of the openings being partly parallel with, and partly at an angle to the axle, a canting clutch-pin passing through the openings in each set of reverse and clutch-hubs into the wheel-hub between the abutting ends of the split-ring, and means for simultaneously moving said reverse-hubs horizontally on said clutch-hubs, substantially as set forth.

4. In a vehicle, the combination with the axle and a pair of wheel-hubs each having an annular receptacle therein, a split expanding ring in each of said receptacles, a pair of clutch-hubs abutting against said wheel-hubs, a pair of reverse-hubs adapted to rotate with said clutch-hubs and be movable in relation thereto, openings through the reverse-hubs and clutch-hubs, a clutch-pin adapted to pass through said openings in each set of hubs and between the ends of the split ring, and to be held straight or canted in either direction, by the movement of the respective reverse-hubs, a predetermined distance toward or away from the respective clutch-hubs; clutch-levers having sliding blocks, and power transmitting connecting rods having their reciprocating ends fulcrumed to said sliding blocks, and means for adjusting the position of said sliding blocks in relation to the said clutch-levers to change the speed substantially as set forth.

5. In a vehicle, a clutch-lever device comprising a canting pin and clutch members adapted to operate the driven members of a vehicle, in combination with such driven members and means for engaging said canting-clutch-pin to drive the members of the vehicle in the direction desired, and to release clutch-pin so as not to cant, causing the said members of the vehicle to revolve loosely on the axle thereby stopping the vehicle without stopping the engine, substantially as set forth.

In testimony whereof I affix my signature in presence of two witnesses.

THEODORE SCHEFFLER.

Witnesses:
JAMES EGAN,
EDITH BENZ.